(12) United States Patent
Chow (10) Patent No.: US 6,799,846 B1
(45) Date of Patent: Oct. 5, 2004

(54) CONNECTOR FOR POSITIONING A PAIR OF SUNGLASSES OR SUNLENSES IN FRONT OF A PAIR OF EYEGLASSES

(75) Inventor: Yin Man Chow, Tsuen Wan (HK)

(73) Assignee: Sunshine Optical Company Limited, Tsuen Wan (HK)

( * ) Notice: Subject to any disclaimer, the term of this patent is extended or adjusted under 35 U.S.C. 154(b) by 96 days.

(21) Appl. No.: 10/449,111

(22) Filed: Jun. 2, 2003

(51) Int. Cl.[7] ................................................. G02C 9/00
(52) U.S. Cl. ........................................... 351/47; 351/57
(58) Field of Search ........................... 351/147, 48, 44, 351/57, 58, 47

(56) References Cited

U.S. PATENT DOCUMENTS 5,412,438 A * 5/1995 Bolle' ........................ 351/47

* cited by examiner

Primary Examiner—Hung Xuan Dang
(74) Attorney, Agent, or Firm—Jacobson Holman PLLC (57) ABSTRACT

A specially designed hook pad which includes a groove or opening for receipt of the bridge portion of a pair of sunglasses or sunlenses. Two screws pass through a front edge of a front projection of the hook pad and force the bridge portion of the sunglasses or sunlenses to either be frictionally held against a central projection of the hook pad or receive the screws in screw holes in the bridge portion. A second groove or opening defined between the central projection of the hook pad and a rear projection fits over the bridge of a pair of prescription eyeglasses. The hook pad holds the sunglasses or sunlenses in front of the lenses of the pair of prescription eyeglasses. A crosspiece of the hook pad interconnects the front, central and rear projections of the hook pad.

18 Claims, 16 Drawing Sheets

CONNECTOR FOR POSITIONING A PAIR OF SUNGLASSES OR SUNLENSES IN FRONT OF A PAIR OF EYEGLASSES

FIELD OF THE INVENTION

The present invention relates to a hook pad which is secured to sunglasses or sunlenses to facilitate the mounting of the sunglasses or sunlenses on a bridge of a pair-of prescription eyeglasses.

BACKGROUND OF THE INVENTION

There are many different systems directed to the mounting of sunglasses in front of the lenses of a pair of prescription eyeglasses. These assemblies are commonly referred to as "clip-ons". As their name implies, a sunglass frame is secured around the rims holding the lenses in a prescription eyeglass frame. Usually, the plurality of pins projecting from the sunglass frame curve around the front and project onto the rear surface of the prescription eyeglass lenses.

Oftentimes, the existing assemblies for clipping on a sunglass frame to a pair of prescription glasses is complicated in its construction and particularly difficult to mount onto an eyeglass frame, particularly when one is driving or participating in an activity that demands their attention. Therefore, there is a need for sunglasses which may easily and quickly befit onto any pair of eyeglasses.

SUMMARY OF THE INVENTION

Accordingly, it is an object of the present invention to quickly and easily, with little mechanical dexterity, clip a pair of sunglasses or sunlenses onto a bridge portion of a pair of prescription eyeglasses.

This object is accomplished by a specially designed hook pad which includes a groove or opening for receipt of the bridge portion of a pair of sunglasses or sunlenses. Two screws pass through a front edge of a front projection of the hook pad and force the bridge portion of the sunglasses or sunlenses to either be frictionally held against a central projection of the hook pad or receive the screws in screw holes in the bridge portion.

A second groove or opening defined between the central projection and a rear projection of the hook pad fits over the bridge of a pair of prescription eyeglasses. The hook pad holds the sunglasses or sunlenses in front of the lenses of the pair of prescription eyeglasses. A crosspiece of the hook pad interconnects the front, central and rear projections of the hook pad.

The hook pad is of a configuration so as to align two pad portions of the hook pad with the nose pads of the pair of prescription eyeglasses onto which the pair of sunglasses or sunlenses are mounted. This facilitates further support of the sunglasses or sunlenses on the pair of prescription eyeglasses.

An embedded metal reinforcement frame in the hook pad strengthens the hook pad which is otherwise made of plastic material. The metal reinforcement frame is U-shaped and extends between the front projection and rear projection and across a crosspiece of the nose pad. Particular strengthening is provided in the portions of the front projection through which two screws pass to secure the nose pad to the pair of sunglasses or sunlenses.

It is therefore another object of the present invention to secure a reinforced nose pad onto a pair of sunglasses or sunlenses and having an opening for receipt of a bridge portion of a pair of prescription eyeglasses.

It is yet another object of the present invention to secure a reinforced nose pad onto a pair of sunglasses or sunlenses and having an opening for receipt of a bridge portion of a pair of prescription eyeglasses with the nose pad having two openings or grooves, one for receipt of the bridge portion of the pair of sunglasses or sunlenses and one for receipt of the bridge portion of the pair of prescription eyeglasses.

It is still yet another object of the present invention to secure a reinforced nose pad onto a pair of sunglasses or sunlenses and having an opening for receipt of a bridge potion of a pair of prescription eyeglasses with the nose pad having two openings or grooves, one for receipt of the bridge portion of the pair of sunglasses or sunlenses and one for receipt of the bridge portion of the pair of prescription eyeglasses with the nose pad being held to the bridge portion of the pair of sunglasses or sunlenses by two horizontally extending screws passing through a front projection of the nose pad and engaging the bridge portion of the pair of sunglasses or sunlenses.

It is another object of the present invention to secure a reinforced nose pad onto a pair of sunglasses or sunlenses and having an opening for receipt of a bridge portion of a pair of prescription eyeglasses with the nose pad having two openings or grooves, one for receipt of the bridge portion of the pair of sunglasses or sunlenses and one for receipt of the bridge portion of the pair of prescription eyeglasses with the nose pad being held to the bridge portion of the pair of sunglasses or sunlenses by two horizontally extending screws passing through a front projection of the nose pad and engaging the bridge portion of the pair of sunglasses or sunlenses and with a rear projection of the nose pad aligning with the nose pads of the prescription eyeglasses.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 1A:
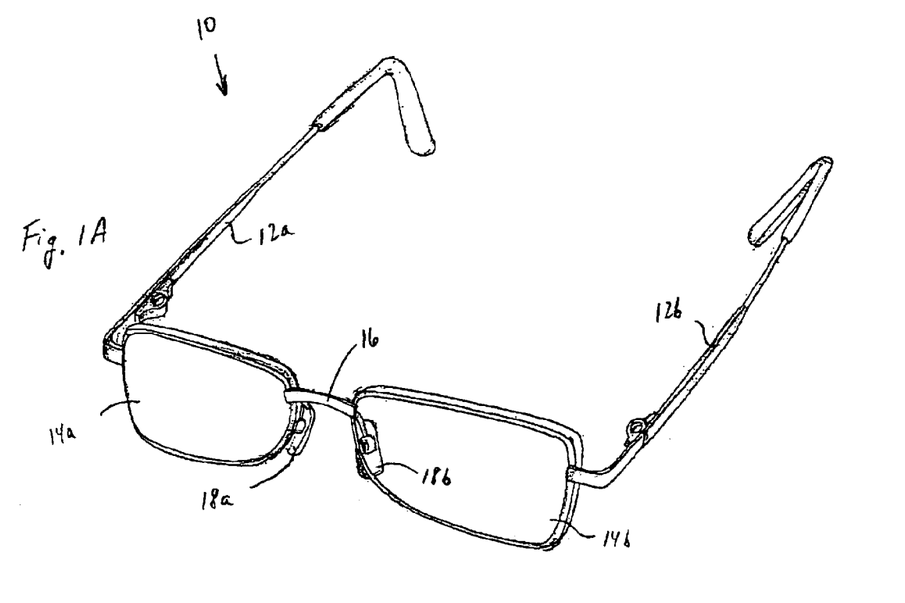
FIG. 1A is a perspective view of a pair of prescription eyeglasses which will make use of the hook pad of the present invention for mounting a pair of sunglasses or sunlenses on the eyeglasses.

In FIG. 1, a pair of eyeglasses 10 includes temples 12a, 12b and lenses 14a, 14b interconnected by a bridge portion 16. Extending from the bridge portion 16 are nose pads 18a, 18b.

Figure 1B:
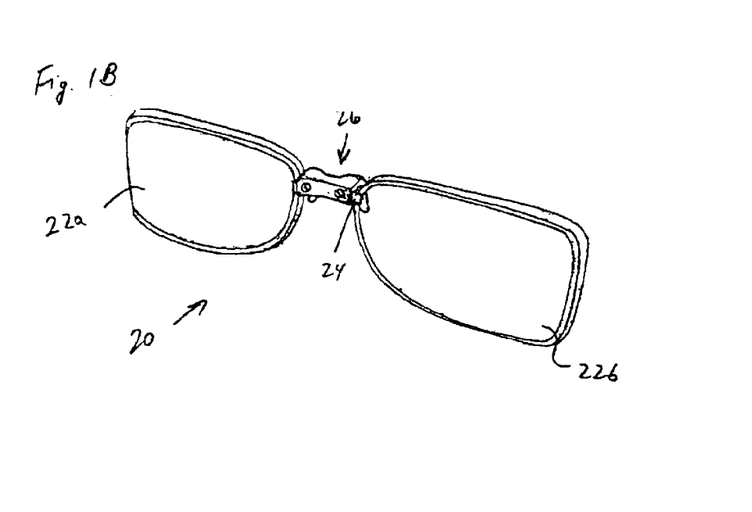
FIG. 1B is a perspective view of a pair of sunglasses having the hook pad of the present invention mounted thereon.

A pair of sunglasses 20 are to be mounted on the pair of eyeglasses 10. The pair of sunglasses 20 includes lenses 22a, 22b interconnected by a bridge portion 24. Secured to the bridge portion 24 is a nose pad 26.

As shown in greater detail in FIGS. 2A through 2D, the nose pad includes three rows of projections. All three projections are interconnected by a cross piece 28, with all of the projections extending in the same direction from the cross piece 28. More specifically, with reference to FIGS. 2A through 2D, nose pad 26 includes front projection 30, central projection 32 and rear projection 34.

Defined between the front projection 30 and central projection 32 is a groove or opening 36 for receipt of the bridge portion of a pair of sunglasses or sunlenses. A second groove or opening 38 is defined between the central projection 32 and rear projection 34 for receipt of the bridge portion of a pair of eyeglasses 10 onto which the sunglasses or sunlenses are to be mounted.

Spaced across a front surface of front projection 30 are two screw holes 40a, 40b for receipt of screws having center lines 42a, 42b, respectively. When inserted, the screws engage the bridge portion 24 of a pair of sunglasses or sunlenses and press the bridge portion against the central projection 32 so as to hold the bridge portion 24 in place. Alternatively, the screws engage a screw hole in the bridge portion of the sunglasses for engagement therein.

Figure 2A:
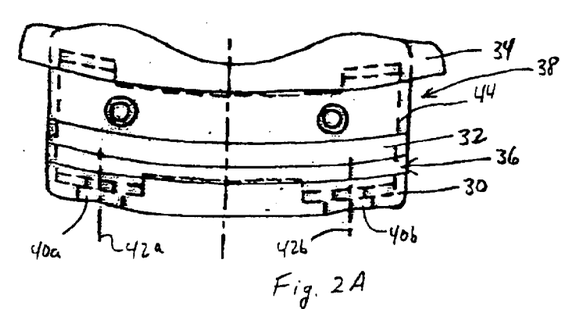
FIG. 2A is a bottom view of the hook pad of the present invention.
Figure 2B:
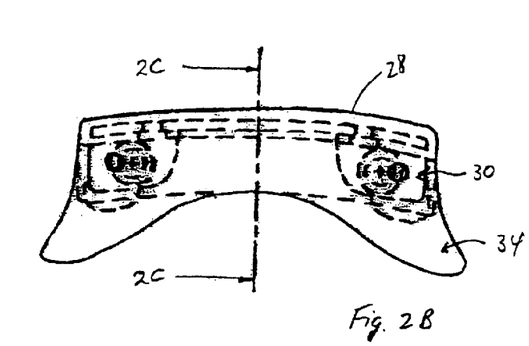
FIG. 2B is a rear view of the hook pad of the present invention.
Figure 2C:
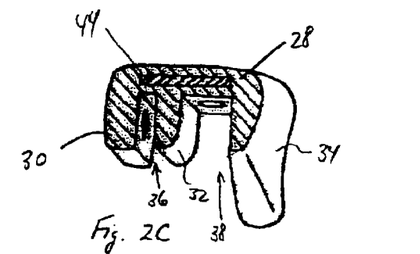
FIG. 2C is a sectional view taken along line 2C—2C of FIG. 2B.
Figure 2D:
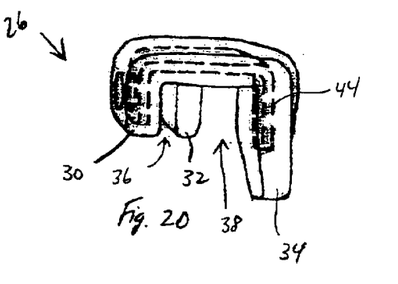
FIG. 2D is a right side view of the hook pad of the present invention.

The nose pad 26 is reinforced by a U-shaped metal plate 44 schematically illustrated in dotted lines in FIGS. 2A, 2B and 2D. The metal plate extends centrally in front projection 30 at the approximate locations of the screws entering the screw holes 40a, 40b of the front projection. The metal plate 44 then travels across the cross piece 28 and turns 90 degrees into the rear projection 34 as best shown in FIG. 2D. As shown in FIG. 2C, the metal plate 44 at the center of nose pad 26 is only present in cross piece 28.

Figures 3A, 3B:
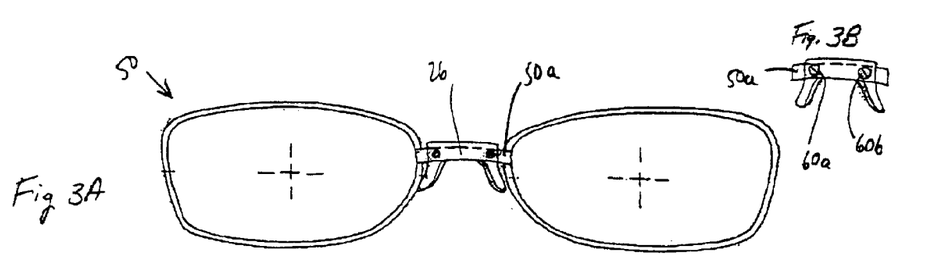
FIG. 3A is a front view of an alternate pair of sunglasses including the hook pad of the present invention.
FIG. 3B is a detailed view of the hook pad mounted on the bridge portion of the sunglasses shown in FIG. 3A.
Figures 3C, 3D:
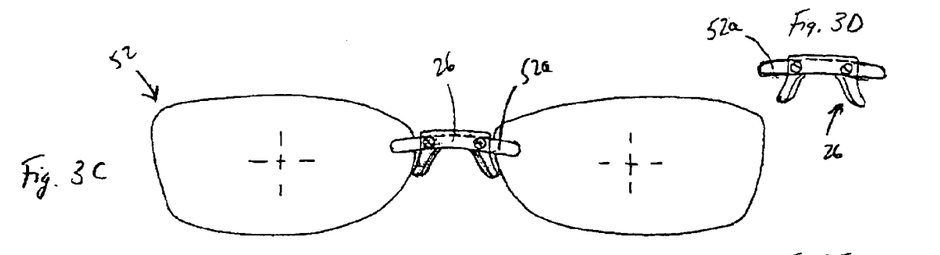
FIG. 3C is a front view of an alternate pair of sunglasses including the hook pad of the present invention.
FIG. 3D is a detailed view of the hook pad mounted on the bridge portion of the sunglasses shown in FIG. 3C.
Figures 3E, 3F:
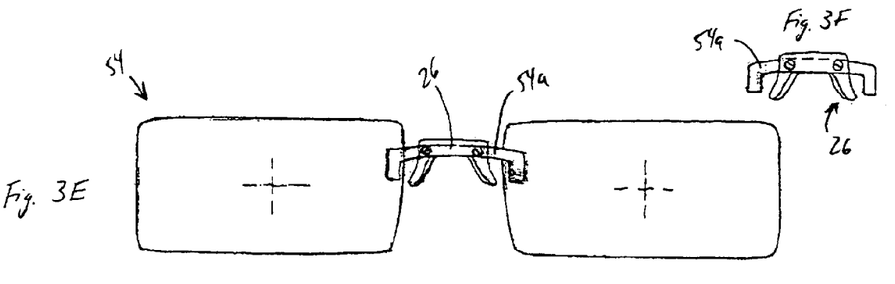
FIG. 3E is a front view of an alternate pair of sunglasses including the hook pad of the present invention.
FIG. 3F is a detailed view of the hook pad mounted or the bridge portion of the sunglasses shown in FIG. 3E.
Figures 3G, 3H:
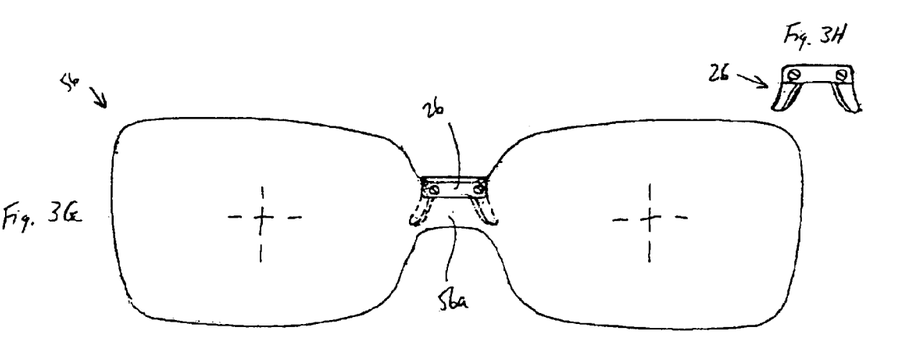
FIG. 3G is a front view of an alternate pair of sunlenses including the hook pad of the present invention.
FIG. 3H is a detailed view of the hook pad fitted on the sunlenses shown in FIG. 3G.

As shown in FIGS. 3A through 3J, a plurality of sunglasses 50, 52, 54 and sunlenses 56, 58 each include a respective bridge portion 50a, 52a, 54a, 56a, 58a onto which a nose pad 26 has been mounted by two screws 60a, 60b as shown by example with reference to FIG. 3B. The same screws are used in all of the embodiments shown in FIGS. 3A through 3J.

Figure 4A:
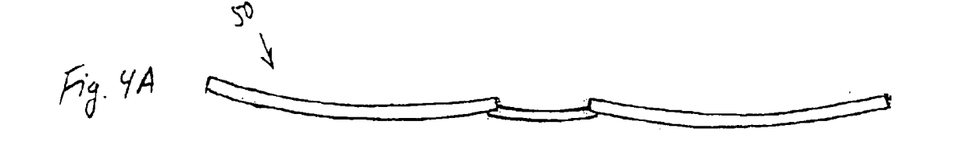
FIG. 4A is a plan view of a pair of sunglasses.
Figure 4B:
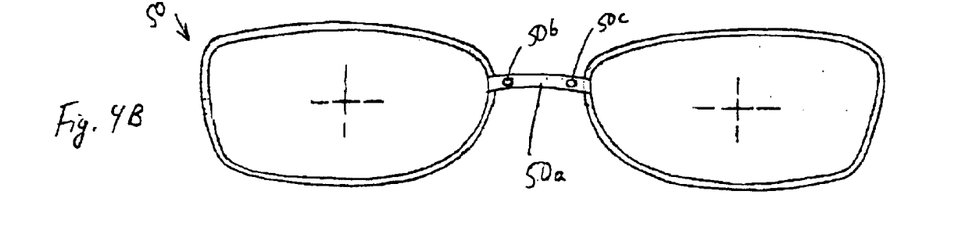
FIG. 4B is a front view of the sunglasses shown in FIG. 4A.
Figure 4C:
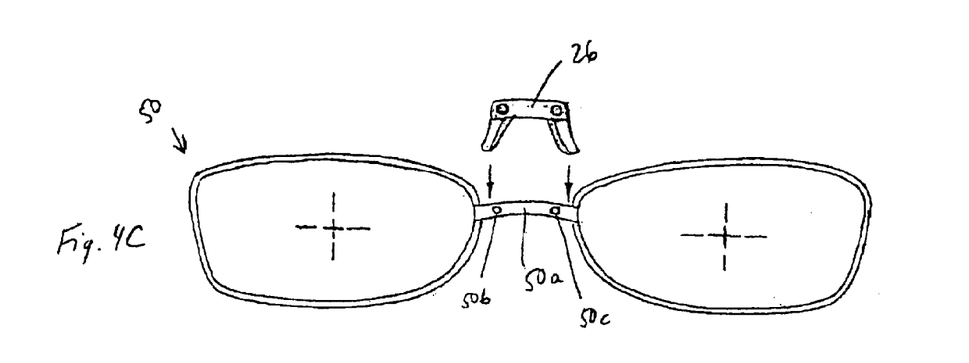
FIG. 4C is an exploded view of a hook pad to be mounted onto the sunglass frame.
Figure 4D:
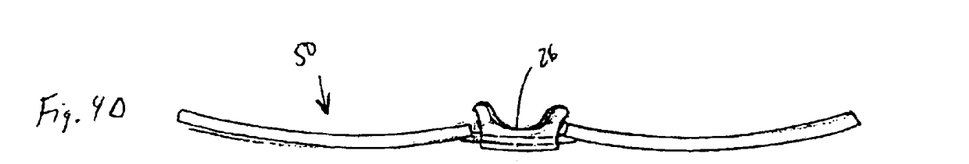
FIG. 4D is a plan view of the sunglasses having a hook pad mounted thereon.
Figure 4E:
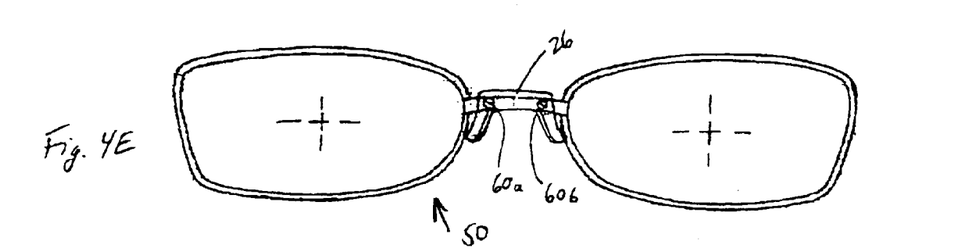
FIG. 4E is a front view of the hook pad mounted on the sunglasses.

In FIGS. 4A through 4E, additional details of the mounting of the sunglasses 50 onto a pair of eyeglasses are shown. In this embodiment as shown in FIG. 4B, the bridge portion 50a of the sunglasses 50 may already include screw holes 50b, 50c. When the nose pad 26 is mounted onto the bridge portion 50a as shown in exploded view FIG. 4C and as shown connected in FIGS. 4D and 4E on the sunglasses 50, the screws 60a, 60b pass through the nose pad 26 and engage in the screw holes 50b, 50c in the bridge portion 50a.

Figure 5A:
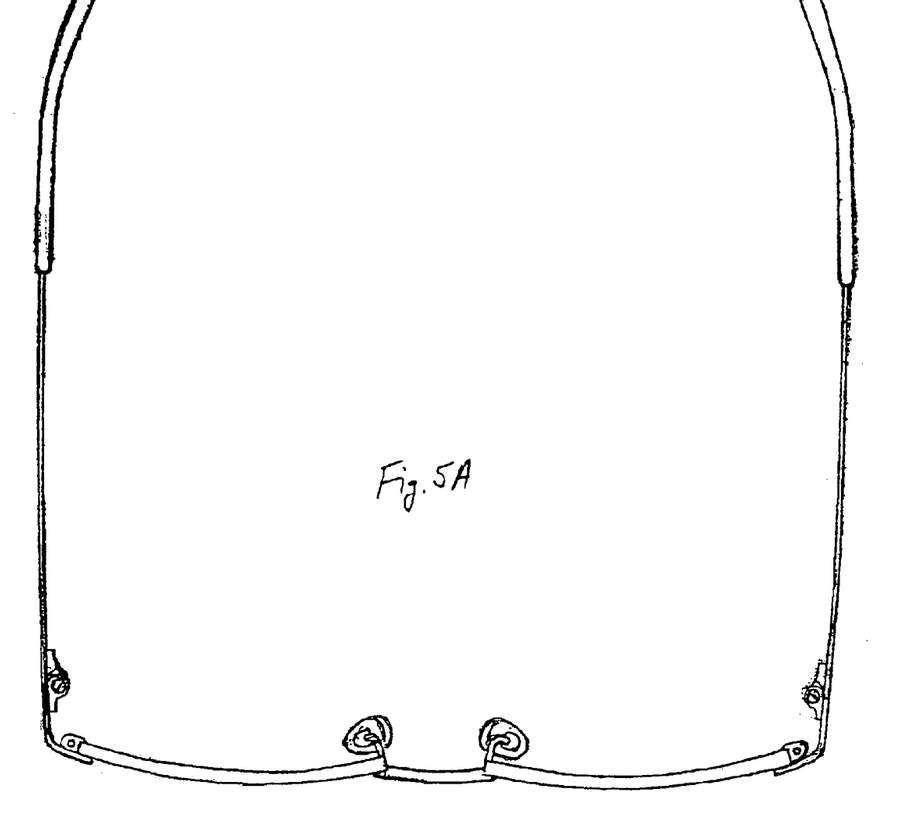
FIG. 5A is a plan view of a pair of eyeglasses.
Figure 5B:
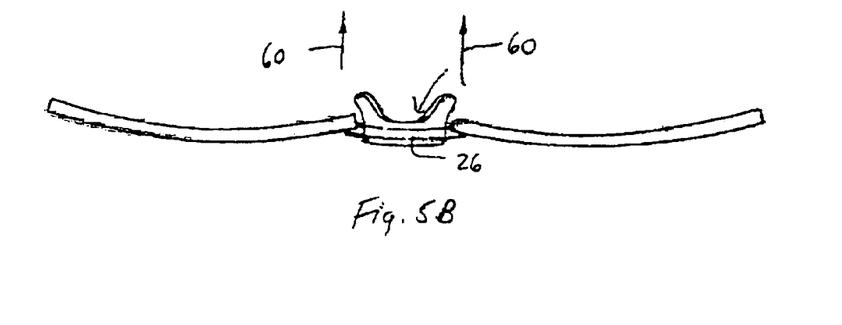
FIG. 5B is a plan view of a pair of sunglasses having a hook pad for mounting on the eyeglasses of FIG. 5A.

FIGS. 5A and 5B show the movement of sunglasses having the nose pad 26 in the direction of arrow 60 to engage a pair of eyeglasses.

Figure 6A:
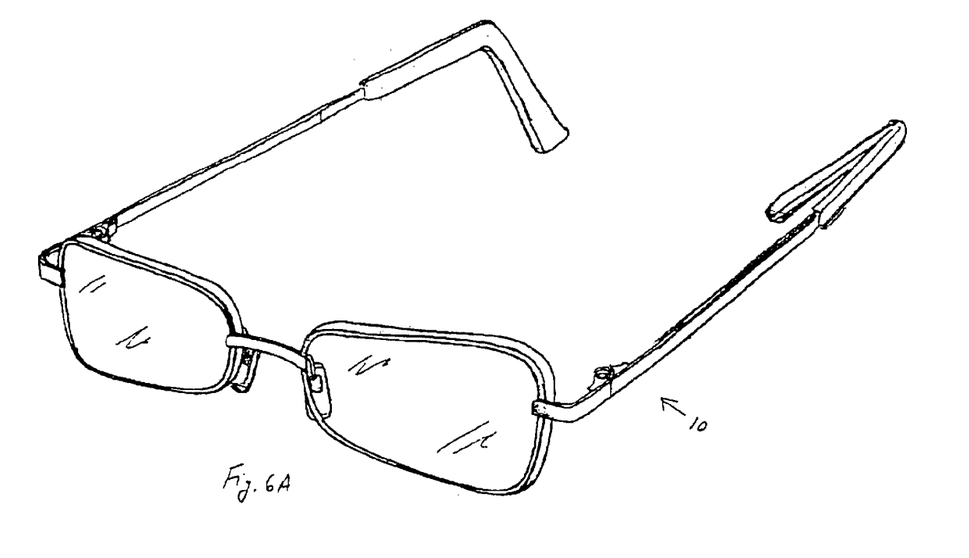
FIG. 6A is a front perspective view of a pair of eyeglasses.
Figure 6B:
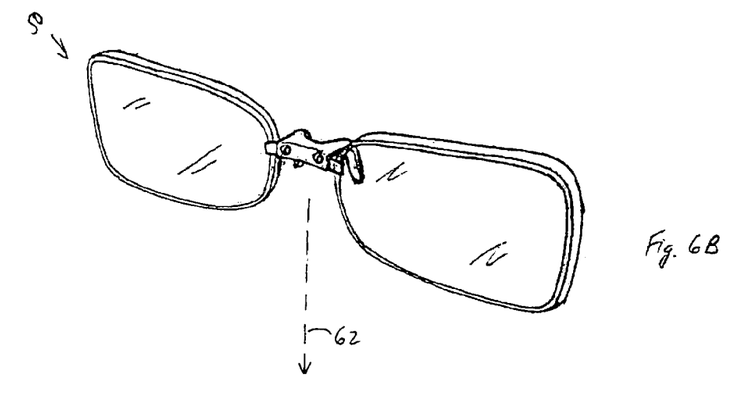
FIG. 6B is a front perspective view of a pair of sunglasses having a hook pad to be mounted on the eyeglasses of FIG. 6A.
Figure 6C:
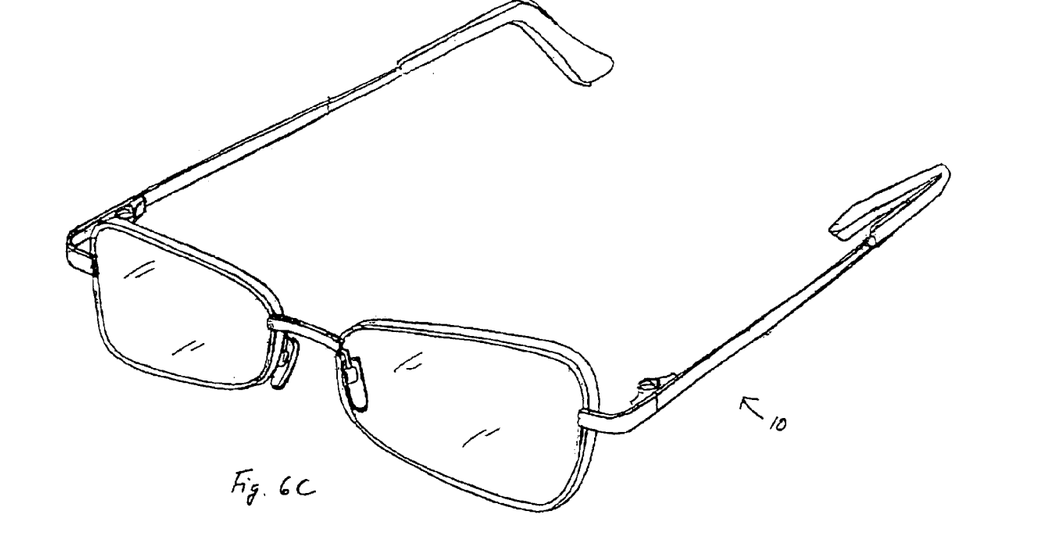
FIG. 6C is a front perspective view of a pair of eyeglasses.
Figure 6D:
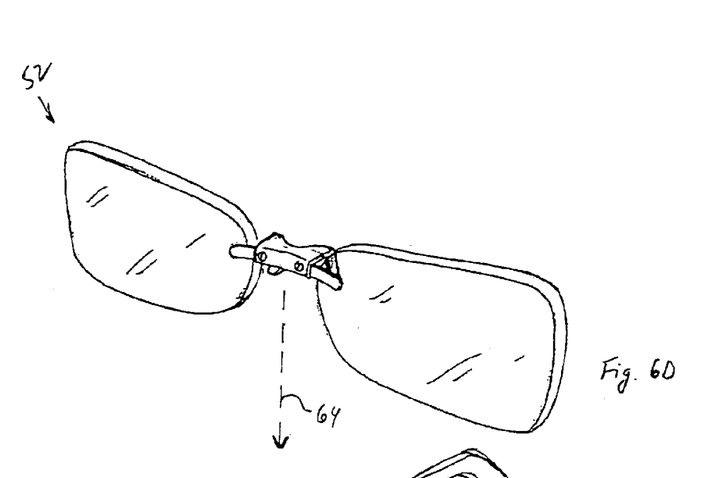
FIG. 6D is a front perspective view of a pair of sunglasses having a hock pad to be mounted on the eyeglasses of FIG. 6C.
Figure 6E:
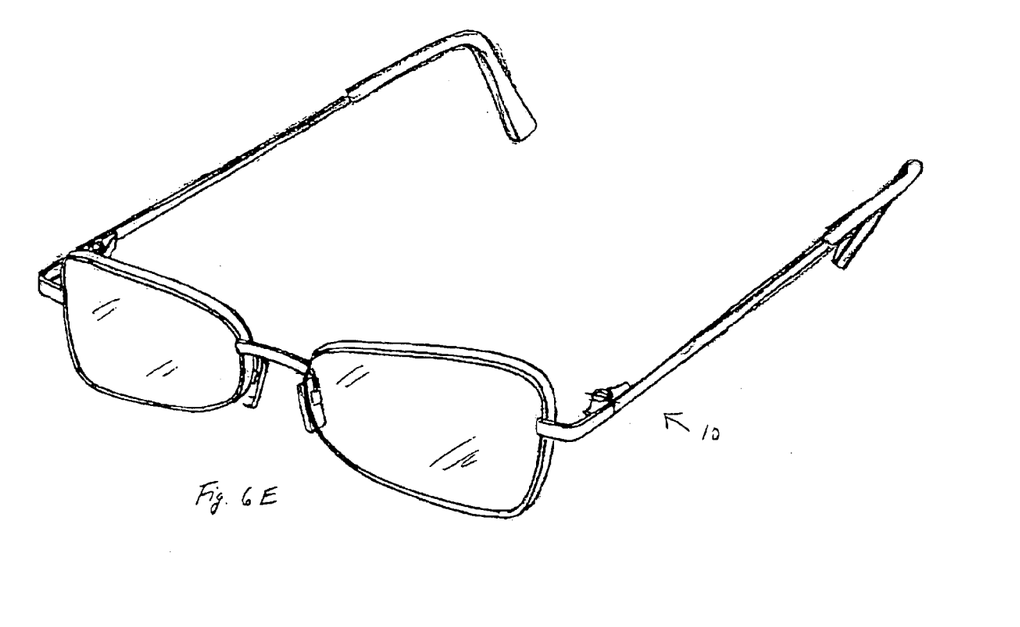
FIG. 6E is a front perspective view of a pair of eyeglasses.
Figure 6F:
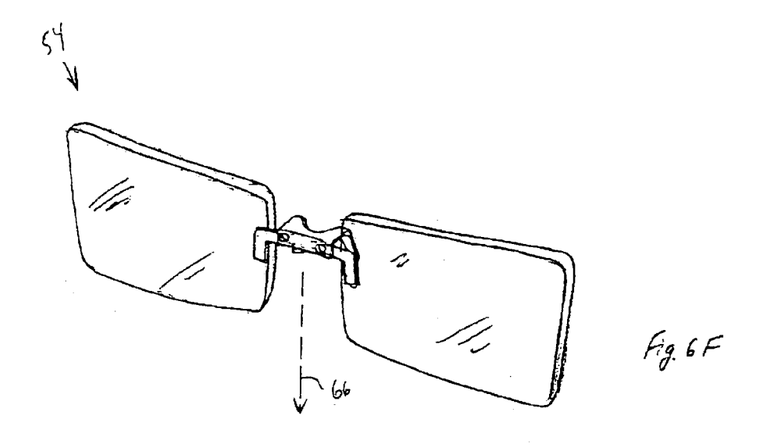
FIG. 6F is a front perspective view of a pair of sunglasses having a hook pad to be mounted on the eyeglasses of FIG. 6E.
Figure 8A:
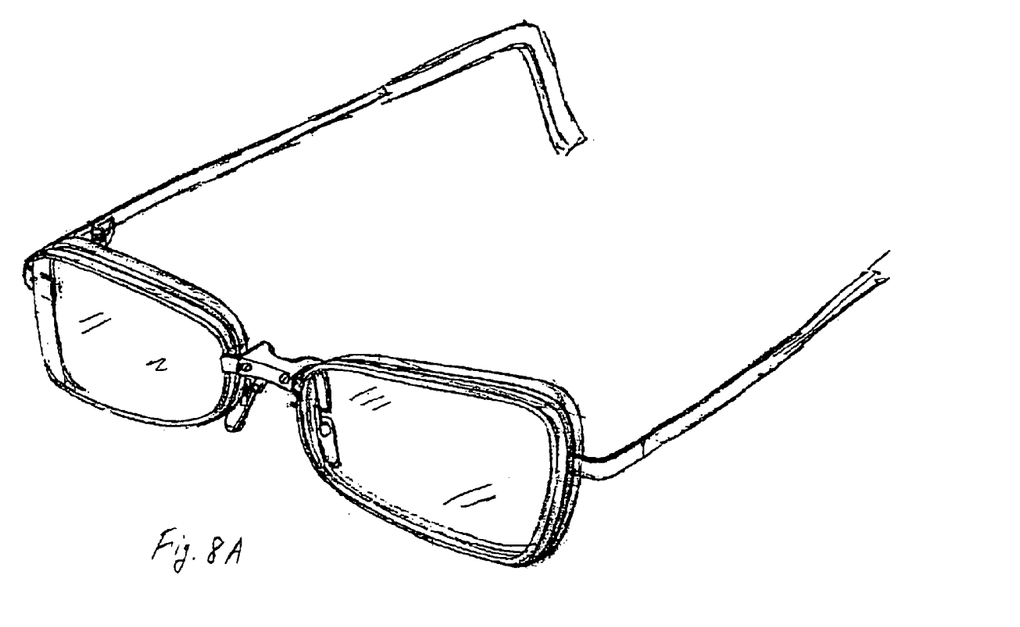
FIGS. 8A through 8E illustrate the mounting of alternative pairs of sunglasses or sunlenses on a pair of eyeglasses, by the use of the hook pad of the present invention.
Figure 8B:
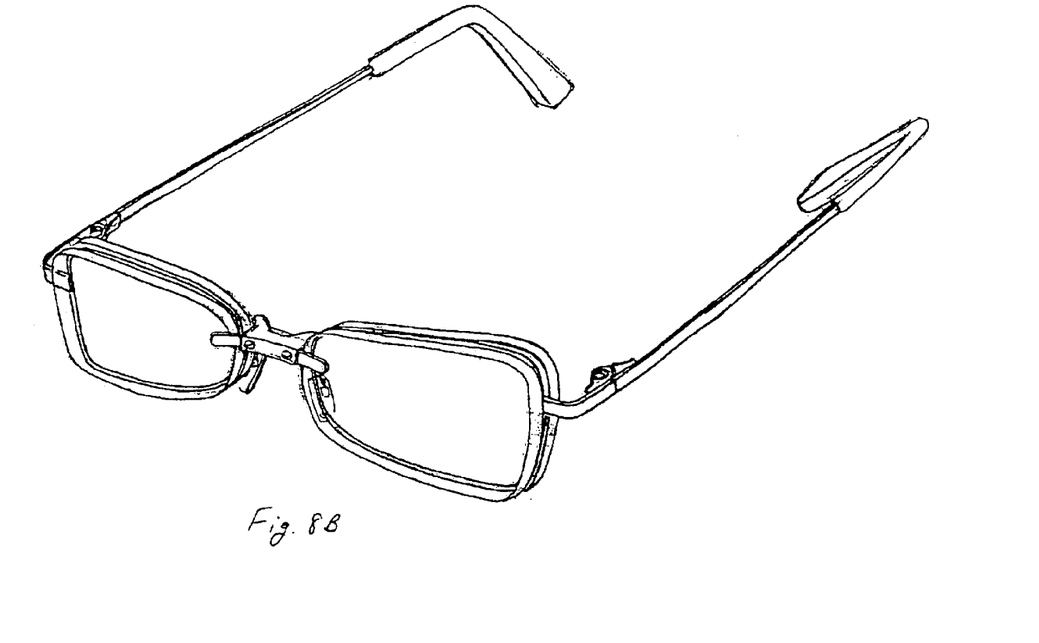
Figure 8C:
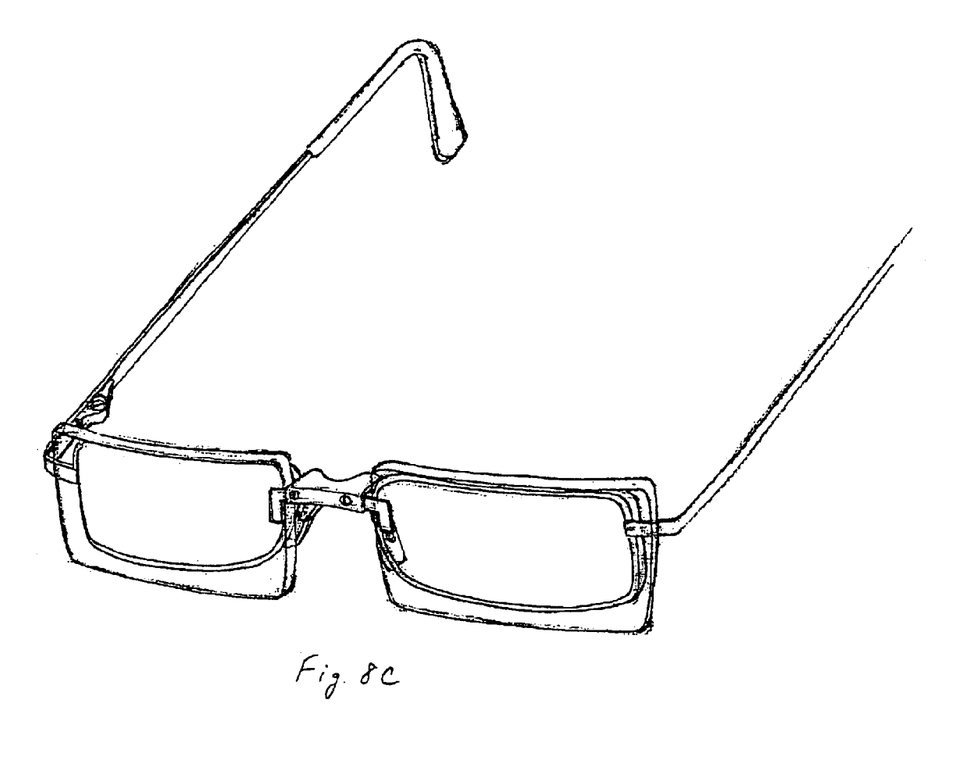

FIGS. 6A and 6B show the mounting of the sunglasses 50 onto a pair of eyeglasses in the direction of arrow 62 with the end result shown in FIG. 8A. Similarly FIGS. 6C and 6D show the mounting of sunglasses 52 onto a pair of eyeglasses 10 by movement in a direction of arrow 64 with the end result shown in FIG. 8B. Similarly, FIGS. 6E and 6F show the mounting of sunglasses 54 onto a pair of eyeglasses 10 by movement in the direction of arrow 66 with the end result shown in FIG. 8C.

Figures 3I, 3J:
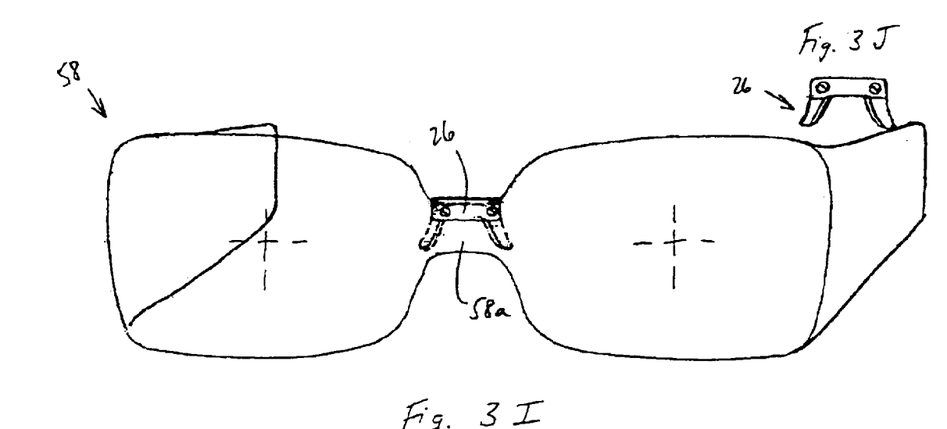
FIG. 3I is a front view of an alternate pair of sunlenses including the hook pad of the present invention.
FIG. 3J is a detailed view of the hook pad fitted on the sunlenses shown in FIG. 3I.
Figure 6G:
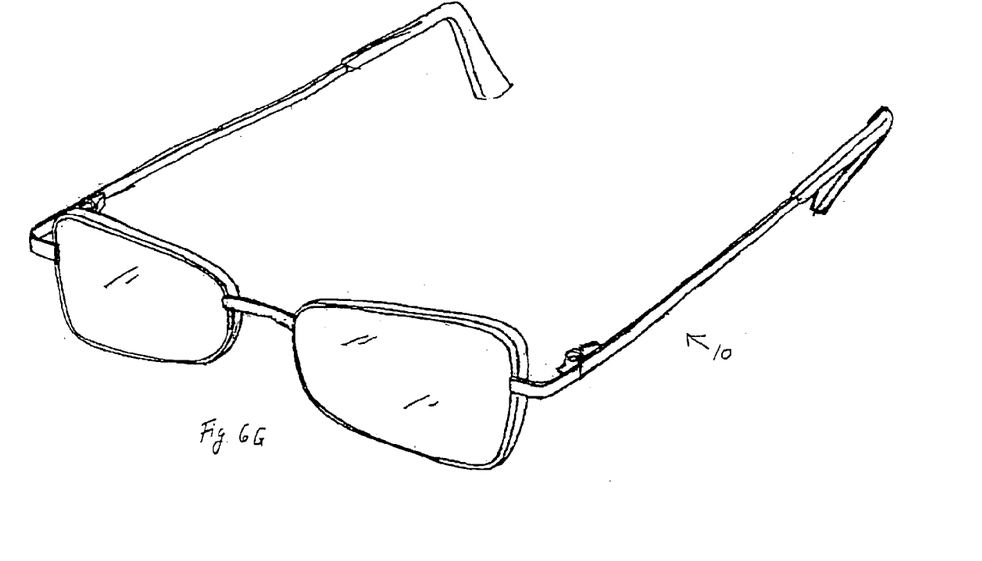
FIG. 6G is a front perspective view of a pair of eyeglasses
Figure 6H:
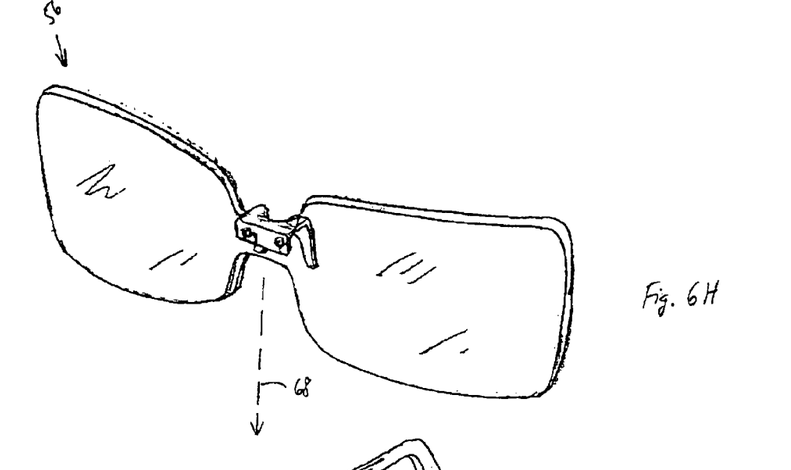
FIG. 6H is a front perspective view of a pair of sunglasses having a hook pad to be mounted on the eyeglasses of FIG. 6G.
Figure 8D:
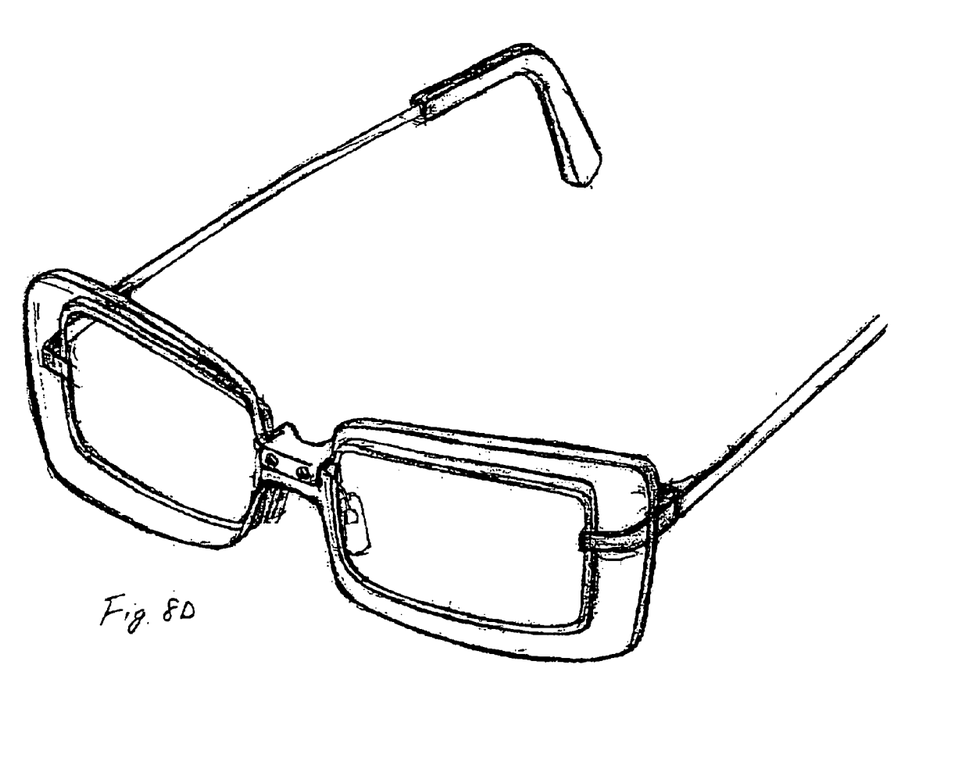
Figure 8E:
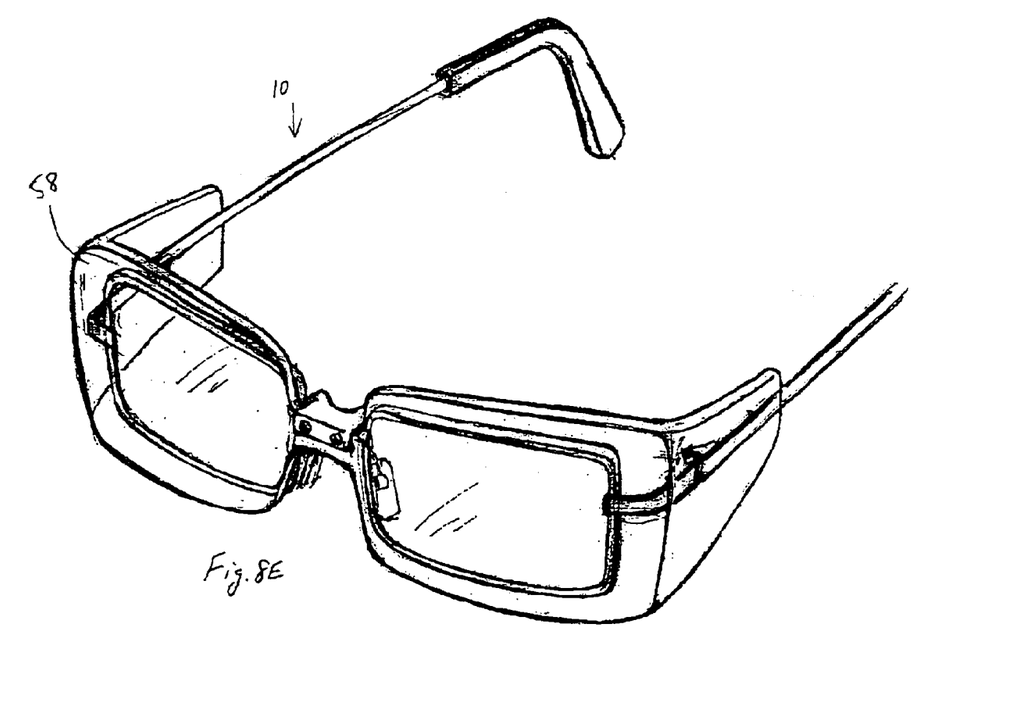

FIGS. 6G and 6H show the mounting of a pair of sunglasses 56 onto a pair of eyeglasses 10 by movement in the direction of arrow 68 with the end result shown in FIG. 8D. Finally, FIG. 8E shows the mounting of the sunlenses 58. (as shown in FIG. 3I) mounted onto a pair of eyeglasses 10.

Figure 7:
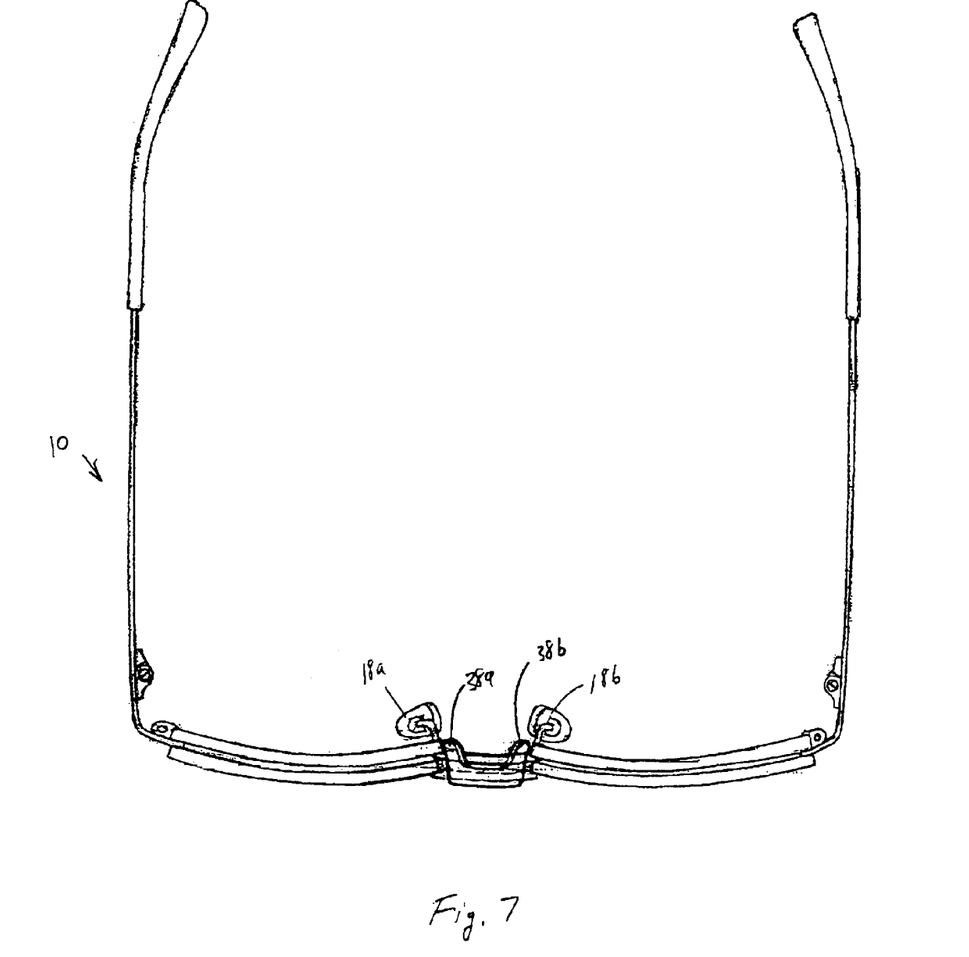
FIG. 7 is a plan view of a pair of eyeglasses having a pair of sunglasses mounted thereon and held in close contact to the eyeglasses by the nose pad of the present invention.

FIG. 7 illustrates the mounting of the sunglasses shown in FIG. 5B onto a pair of eyeglasses 10 as shown in FIG. 5A.

After the mounting of the sunglasses onto the eyeglasses, it is noted that the divergent portions 38a, 38b of the rear projection 38 define an opening for the nose and assist in the positioning of the eyeglasses with the nose pads 18a, 18b.

Accordingly, by the present invention, a relatively simply formed nose pad is manufactured to position many varied types of sunglasses or sunlenses onto a pair of eyeglasses. As long as a bridge or nose portion is present in the sunglasses or sunlenses, the sunglasses or sunlenses may be mounted onto a pair of eyeglasses by the use of a nose pad of the present invention.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A connector for positioning a pair of sunglasses or sunlenses in front of a pair of eyeglasses, said connector comprising:
    a body including a cross piece having a front projection, a central projection and a rear projection spaced apart from each other and extending in a same direction from the crosspiece and being located on one side of the crosspiece,
    a first opening defined by said front projection, said central projection and said cross piece for receipt of a portion of the sunglasses or sunlenses between said front projection and said central projection and below said crosspiece, and
    a second opening defined by said central projection, said rear projection and said cross piece for receipt of a bridge portion of the pair of eyeglasses between said central projection and said rear projection and below said crosspiece to mount said sunglasses or sunlenses in front of said eyeglasses.

2. The connector as claimed in claim 1, wherein a reinforcing plate is located in said body.

3. The connector as claimed in claim 2, wherein said reinforcing plate is U-shaped.

4. The connector as claimed in claim 2, wherein said reinforcing plate is metal.

5. The connector as claimed in claim 4, wherein said body is plastic.

6. The connector as claimed in claim 1, wherein at least one screw extends through said front projection for engaging and securing the portion of the sunglasses or sunlenses located in said first opening.

7. The connector as claimed in claim 1, wherein said front projection includes two screw holes for receipt of screws passing through said front projection for engaging and securing the portion of the sunglasses or sunlenses located in said first opening.

8. The connector as claimed in claim 7, wherein a screw extends through each of said two screw holes for engaging and securing the portion of the sunglasses or sunlenses located in said first opening.

9. The connector as claimed in claim 1, wherein said rear projection is longer than said front projection.

10. A sun screening assembly for positioning a sun screening structure on a bridge portion and in front of a pair of eyeglasses, said sun screening assembly comprising:
    a pair of sunglasses or sunlenses, and
    a nose pad having a body including a crosspiece having a front projection, a central projection and a rear projection spaced apart from each other and extending in a same direction from the crosspiece and being on one side of the crosspiece,
    a first opening defined by said front projection, said central projection and said crosspiece for receipt of a portion of the sunglasses or sunlenses between said front projection and said central projection and below said crosspiece, and
    a second opening defined by said central projection, said rear projection and said crosspiece for receipt of a bridge portion of the pair of eyeglasses between said central projection and said rear projection and below said crosspiece to mount said sunglasses or sunlenses in front of said eyeglasses.

11. The sun screening assembly as claimed in claim 10, wherein a reinforcing plate is located in said body.

12. The sun screening assembly as claimed in claim 11, wherein said reinforcing plate is U-shaped.

13. The sun screening assembly as claimed in claim 11, wherein said reinforcing plate is metal.

14. The sun screening assembly as claimed in claim 13, wherein said body is plastic.

15. The sun screening assembly as claimed in claim 10, wherein at least one screw extends through said front projection for engaging and securing the portion of the sunglasses or sunlenses located in said first opening.

16. The sun screening assembly as claimed in claim 10, wherein said front projection includes two screw holes for receipt of screws passing through said front projection for engaging and securing the portion of the sunglasses or sunlenses located in said first opening.

17. The sun screening assembly as claimed in claim 16, wherein a screw extends through each of said two screw holes for engaging and securing the portion of the sunglasses or sunlenses located in said first opening.

18. The sun screening assembly as claimed in claim 10, wherein said rear projection is longer than said front projection.

* * * * *